(12) United States Patent
Wagoner et al.

(10) Patent No.: US 9,716,444 B2
(45) Date of Patent: Jul. 25, 2017

(54) PULSE WIDTH MODULATION (PWM) FOR MULTI-LEVEL POWER INVERTERS

(71) Applicant: GE Energy Power Conversion Technology Ltd, Warwickshire (GB)

(72) Inventors: Robert Gregory Wagoner, Salem, VA (US); Cheng Luo, Pittsburgh, PA (US); Siddharth Pant, Pittsburgh, PA (US)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 14/933,004

(22) Filed: Nov. 5, 2015

(65) Prior Publication Data

US 2017/0133946 A1     May 11, 2017

(51) Int. Cl.
*H02M 7/483*     (2007.01)
*H02M 7/5387*    (2007.01)
(Continued)

(52) U.S. Cl.
CPC .............. *H02M 7/537* (2013.01); *H02M 1/42* (2013.01)

(58) Field of Classification Search
CPC . H02M 2001/0025; H02M 2001/0038; H02M 2001/0048; H02M 2001/0054; H02M 1/08; H02M 1/081; H02M 1/084; H02M 1/4208; H02M 1/4216; H02M 1/4233; H02M 7/483; H02M 7/487; H02M 7/5387
See application file for complete search history.

(56) References Cited

U.S. PATENT DOCUMENTS 6,023,417 A     2/2000  Hava et al.
6,490,185 B1 *  12/2002 Yamanaka ............ H02M 7/487
                                              363/132
(Continued)

FOREIGN PATENT DOCUMENTS

EP          1858150      8/2011
WO       2007092466      8/2007

OTHER PUBLICATIONS

Chung et al., "Minimum-Loss Strategy for Three-Phase PWM Rectifier", IEEE Transactions on Industrial Electronics, vol. No. 46, Issue No. 3, pp. 517-526, Jun. 1999.
(Continued)

*Primary Examiner* — Gary L Laxton
(74) *Attorney, Agent, or Firm* — GE Global Patent Operation; Scott R. Stanley (57) ABSTRACT

Provided is a method for controlling operation of semiconductor gates in a power conversion system including one or more multilevel inverters coupleable to a modulator and a controller. The method includes generating, via the controller, a control signal responsive to an output current power factor associated with the inverters and producing a discontinuous pulse width modulation reference signal based upon the control signal and a target output power, the discontinuous pulse width modulation reference signal being indicative of shifting a phase angle between current and voltage. A gating signal is generated for output from the modulator, as a function of the reference signal and a carrier waveform. The gating signal adjusts the phase angle to prevent switching of the semiconductor gates.

22 Claims, 7 Drawing Sheets

(51) Int. Cl.
*H02M 7/537* (2006.01)
*H02M 1/42* (2007.01)

(56) References Cited

U.S. PATENT DOCUMENTS

| | | | |
|---|---|---|---|
| 6,697,274 B2 * | 2/2004 | Bernet | H02M 7/487 363/132 |
| 7,126,409 B2 * | 10/2006 | Nielsen | H02M 7/487 327/391 |
| 7,629,764 B2 | 12/2009 | Shoemaker et al. | |
| 7,649,756 B2 | 1/2010 | Kerkman et al. | |
| 8,115,433 B2 | 2/2012 | Welchko | |
| 8,269,434 B2 | 9/2012 | Welchko et al. | |
| 8,737,100 B2 * | 5/2014 | Chapman | H02M 7/537 363/95 |
| 8,929,114 B2 * | 1/2015 | Li | H02M 1/34 363/130 |
| 2003/0048650 A1 * | 3/2003 | Asaeda | H02M 7/487 363/98 |
| 2005/0207194 A1 * | 9/2005 | Baudesson | H02M 7/487 363/98 |
| 2007/0296364 A1 | 12/2007 | Shoemaker et al. | |
| 2010/0071970 A1 | 3/2010 | Welchko et al. | |
| 2010/0072928 A1 | 3/2010 | Welchko | |

OTHER PUBLICATIONS

Nguyen et al., "An Optimized Discontinuous PWM Method to Minimize Switching Loss for Multi Level Inverters", IEEE Transactions on Industrial Electronics, vol. No. 58, Issue No. 9, pp. 3958-3966, Sep. 2011.

Brueske et al., "Efficiency Optimisation of a Neutral Point Clamped Inverter for Electric Vehicles by Means of a Variable DC Input Voltage and Different Power Semiconductors", 16th European Conference on Power Electronics and Applications, pp. 1-10, Aug. 26, 2014.

PCT Search Report and Written Opinion issued in connection with corresponding PCT Application No. PCT/GB2016/053365 on Feb. 15, 2017.

* cited by examiner

PULSE WIDTH MODULATION (PWM) FOR MULTI-LEVEL POWER INVERTERS

I. FIELD OF THE INVENTION

The present disclosure relates to the field of power conversion systems, and particularly to certain PWM multi-level multi-phase power inverters.

II. BACKGROUND OF THE INVENTION

Power conversion systems play a significant role in converting energy produced by alternate energy sources, such as photovoltaic (PV) arrays and wind converters, into an optimized power form for supply to the electric grid. Insulated-gate bipolar transistor (IGBT) inverters or metal-oxide-semiconductor field-effect transistor (MOSFET) devices are often fundamental components in any power conversion system. In these power conversion systems, IGBT/MOSFET gate control is critical to optimizing output power.

Maximizing efficiency is an important consideration when optimizing the conversion of power from one form to another.

As is well known in the art, the peak semiconductor temperature is a function of the real and reactive power components. Because of IGBT temperature limitations, among other factors, conventional power conversion systems attempt to optimize only real power. By way of background, and as illustrated in FIG. 1, the real power and reactive power outputs of a power converter can be specified by a PQ curve.

Figure 1:
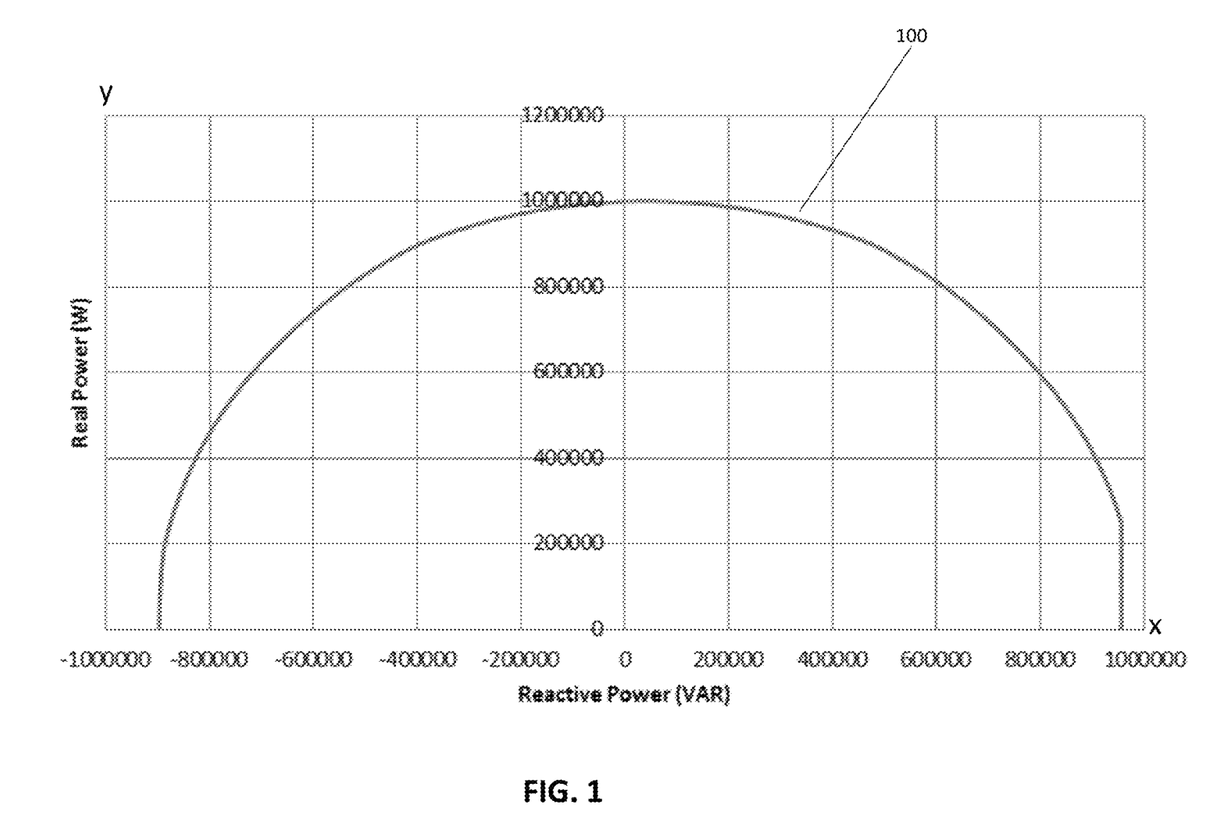
FIG. 1 is a graphical illustration of a conventional PQ curve depicting real and reactive power components as a function of peak semiconductor temperature.

In FIG. 1, a PQ curve 100 represents the interplay between real power and reactive power, for a fixed value of peak semiconductor temperature in a 1 MW inverter. In FIG. 1, for example, the x and y axes represent reactive power (Volt-Amp Reactive, VAR) and real power (watts, W), respectively. The curve 100 depicts changes in the power factor (PF) at a load. For example, changes in PF (e.g., as a function of amperage and voltage) can be measured in terms of power in kilowatts. In the exemplary curve 100, as PF changes in terms of reactive power instead of real power, IGBT temperatures typically get hotter.

In the curve 100, the total reactive power is at a minimum when the total real power is at its peak. Conventional power conversion systems are mainly concerned with real power. For example, in a PV array attempting to put 1 megawatt (MW) on the electric grid, conventional IGBT controls would be optimized to provide this 1 megawatt under optimal temperature conditions. That is, conventional systems simply focus on optimizing real power at the expense of reactive power. In some scenarios, however, there is also a need to focus on reactive power.

For example, in providing power to the electric grid if the line voltage is low or high, reactive power can be used to adjust the line voltage to reduce these high/low fluctuations. Thus, in many scenarios, optimizing reactive power can have significant benefits. In conventional systems, however, maximizing reactive power should not require sacrificing real power.

The particular shape of the PQ curve 100 depends on several factors, such as how filters are implemented, as well as other components. For example, the PQ curve 100 is slightly offset to the right. To get more reactive power or VARs to the right side than on the left, factors such as those above can be adjusted to change the shape of the PQ curve 100. The goal, however, is to be able to get as much reactive power as real power, or even more.

Factors limiting optimization of reactive power include IGBT switching and conduction losses. Reducing these losses is necessary for optimizing the PF of the IGBT conversion system and maximizing reactive power.

III. SUMMARY OF THE EMBODIMENTS

Given the aforementioned deficiencies, a need exists for reducing switching and conduction losses in power conversion systems, especially those including IGBT inverters, to optimize reactive power.

Embodiments of the present invention provide a method for controlling operation of semiconductor gates in a power conversion system including one or more multilevel inverters coupleable to a modulator and a controller. The method includes generating, via the controller, a control signal responsive to an output current power factor associated with the inverters, and producing a discontinuous pulse width modulated (DPWM) reference signal based upon the control signal and a target output power, the DPWM reference signal being indicative of shifting a phase angle between current and voltage.

DPWM prevents the IGBT from switching at the normal PWM switching rate during a portion of the fundamental frequency cycle. A gating signal is generated for output from the modulator, as a function of the reference signal and a carrier waveform. That is, the IGBT is forced not to switch for a substantial portion of the fundamental current waveform. The gating signal adjusts a phase angle of the timing of the discontinuous portion of the pulse width modulation.

The embodiments provide a technique for reducing losses at off-unity PFs and providing a wider PQ curve. This can improve the reliability of all components in the associated systems (e.g., solar converters, wind converters, etc.).

These and other aspects of the present disclosure will become apparent from the following description of the embodiments taken in conjunction with the following drawings and their captions, although variations and modification therein may be affected without departing from the spirit and scope of the novel concepts of the disclosure.

IV. BRIEF DESCRIPTION OF THE DRAWINGS

The present disclosure is illustrated in the accompanying drawings, throughout which, like reference numerals may indicate corresponding or similar parts in the various figures. The drawings are only for purposes of illustrating preferred embodiments and are not to be construed as limiting the invention. Given the following enabling description of the drawings, the novel aspects of the present disclosure should become evident to a person of ordinary skill in the art.

V. DETAILED DESCRIPTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In various embodiments, multi-level power conversion is achieved in a manner that provides higher power quality and density than conventional approaches at lower costs. In one embodiment, a multi-level (e.g., three levels) inverter is provided to achieve the multiple output voltage levels. Control signals, output from a controller, selectively activate/deactivate internal converter components to control the voltage output levels—increasing the levels to five, seven, nine, eleven, or more.

In these multi-level structures, switches devices, DC link capacitors, and other internal components, can be configured to operate in a cascading manner to produce the required multiple output levels. The controller can be configured to control operation of the switch elements—activating (turning on) and deactivating (turning off) power switches within the switch elements, one at a time. Activating and deactivating the power switches enables precise control of the voltage levels output from the converter.

Inverters are utilized in applications requiring direct conversion of electrical energy from DC to AC or indirect conversion from AC to AC. DC to AC conversion is useful for many fields, including power conditioning, harmonic compensation, motor drives, and renewable energy grid-integration. The DC to AC power conversion is the result of power switching devices, which are commonly fully controllable semiconductor power switches.

Output waveforms produced by semiconductor power switches are made up of discrete values, producing fast transitions rather than smooth ones. The ability to produce near sinusoidal waveforms around the fundamental frequency is dictated by the modulation technique controlling when, and for how long, the power valves are on and off. Common modulation techniques include the carrier-based technique, or pulse width modulation (PWM), space-vector technique, and the selective-harmonic technique.

As noted above, switching and conduction losses in IGBTs are among the obstacles to optimizing reactive (VAR) power in power conversion systems. Embodiments of the present invention provide a DPWM technique with optimization of IGBT temperature reduction by changing the phase parameter based on output current PF. That is, operating in DPWM mode prevents the IGBT from switching at peak current, consequently preventing switching loss during this period of time. The gating signal shifts a phase angle of the semiconductor gates for the DPWM mode, to adjust the timing the IGBT is prevented from switching, in order to minimize the switching loss. Additionally, the reduction of switching losses enables the IGBT to run at cooler temperatures. This process is explained in greater detail below.

Figure 2:
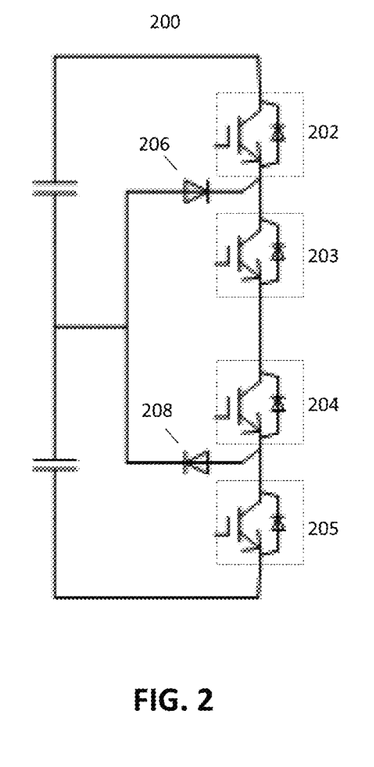
FIG. 2 is a block diagram illustration of the general topology of a 3-level inverter used in a multi-level conversion system in accordance with the embodiments.

FIG. 2 is an illustration of the general topology of a 3-level inverter 200 used in a multi-level conversion system in accordance with the embodiments. The topology of the inverter 200 is referred to as a neutral point clamped (NPC) 3-level inverter. Active semiconductors in the inverter 200 include four series connected IGBTs 202-205 and diodes 206 and 208, which collectively form the NPC.

As the PF of current output from the converter 200 changes over a range, to keep the peak semiconductor temperature at a particular constant level, the total output current also changes depending upon the PF of the output current. This process produces a PQ curve of output power (Watts) vs. reactive power (VAR). PQ curve 100 of FIG. 1 graphically illustrates this principle, as applied to a conventional 1 MW inverter.

Figure 3:
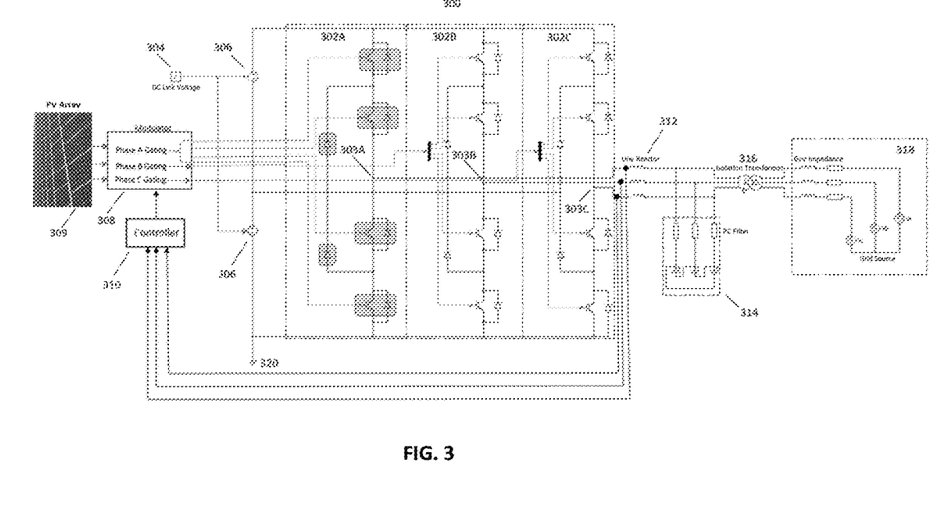
FIG. 3 is a detailed block diagram illustration of an exemplary multi-level conversion system in which embodiments of the present invention can be practiced.

FIG. 3 is a detailed block diagram illustration of an exemplary multi-level power conversion system 300 in which embodiments of the present invention can be practiced. Embodiments of the present invention, however, are not limited to a 3-level inverter, and can be implemented in any multi-level power conversion system.

The power conversion system 300 includes 3-level inverter segments 302 A-C, each being associated with a single phase of an energy supply system. As described above in reference to FIG. 2, each of the inverter segments 302 A-C includes four series connected IGBTs and two diodes, forming an NPC, along with respective output connections 303 A-C. Also included is a DC link voltage source 304 (e.g., a battery, PV array, etc.) supplying power to capacitor banks 306. The capacitor banks 306 feed all phases of a three-phase power system.

A modulator 308 is coupled to a controller 310. In accordance with the embodiments, the modulator 308 is configured to (a) change phase parameters based on the output current power factor, (b) synchronously inject control signals into a sine wave at the peak of the output current power factor, and (c) over-modulate the sine wave to stop the switching when the current flowing through the IGBT reaches its peak to prevent switching loss and to optimize real power.

The controller 310 senses changes in the phase angle, output power, and power factor of the multilevel conversion system 300. The controller 310 is user programmable, thereby receiving user input to generate control signal(s) to control IGBT operation and switching, as discussed in greater detail below.

Power is transmitted from the inverters 302 A-C, via the output connections 303 A-C, through line reactor and doctors 312 and a filter 314, to an isolation transformer 316, and ultimately to a utility grid 318. A ground terminal 320 represents the convention of the conversion system 300 such that the PV array (i.e., direct current link voltage) 304 has a ground on the negative side.

Positive terminals of a PV array 309 feed the positive side of the power conversion system 300. The IGBTs switch in a manner to control the system midpoint voltage. The present invention, however, is not limited to the supply of power from PV arrays. In other embodiments, for example, two back-to-back inverters could be used with the alternating current (AC) on one side, a direct current (DC) link in the middle, and then flipped around to provide DC to AC.

Other configurations describing from where the DC originates are within the spirit and scope of the present invention.

Multilevel conversion systems, such as the system 300, provide an environment in which embodiments of the present invention can be implemented. The controller 310 enables creation of a control signal, which acts as a common-mode signal, for injection onto an output sine-wave voltage signal output from the modulator 308 to the IGBTs. This DPWM injection technique over modulates the sine wave such that the IGBTs temporarily and predictably stop switching.

In an exemplary operational scenario, one of the multilevel IGBT inverters of the multilevel conversion system 300 (e.g., 302A) is connected to the grid 318 through the isolation transformer 316. The inverter 302A is controlled in open loop condition by pre-calculating, via the controller 310, a modulation index and phase angle based on a desired output power and power factor. In response to these determinations, a DPWM reference signal generated and output from the modulator 308, having different preselected phase angles (e.g., 30°, 0°, and 60°, etc.).

The DPWM reference signal is compared, using known methods, to a suitable carrier wave to generate the PWM gating signal (i.e., the DPWM reference signal) output from the modulator 308. This gating signal is used to shift the phase angle of the discontinuous PWM to gates of the IGBTs.

When the IGBTs stop switching, with the gating signal being shifted to align the phase angle of the semiconductor gates to periods of maximum current, losses at off unity PFs can be substantially reduced. As the power factor of the load changes, for example, creating corresponding changes in current, the power factor transitions to being all reactive. Correspondingly, the reactive power can be maximized to provide more reliable power, for example, to the electric grid. These techniques are explained more fully in the discussion below relating to FIG. 4.

Figure 4:
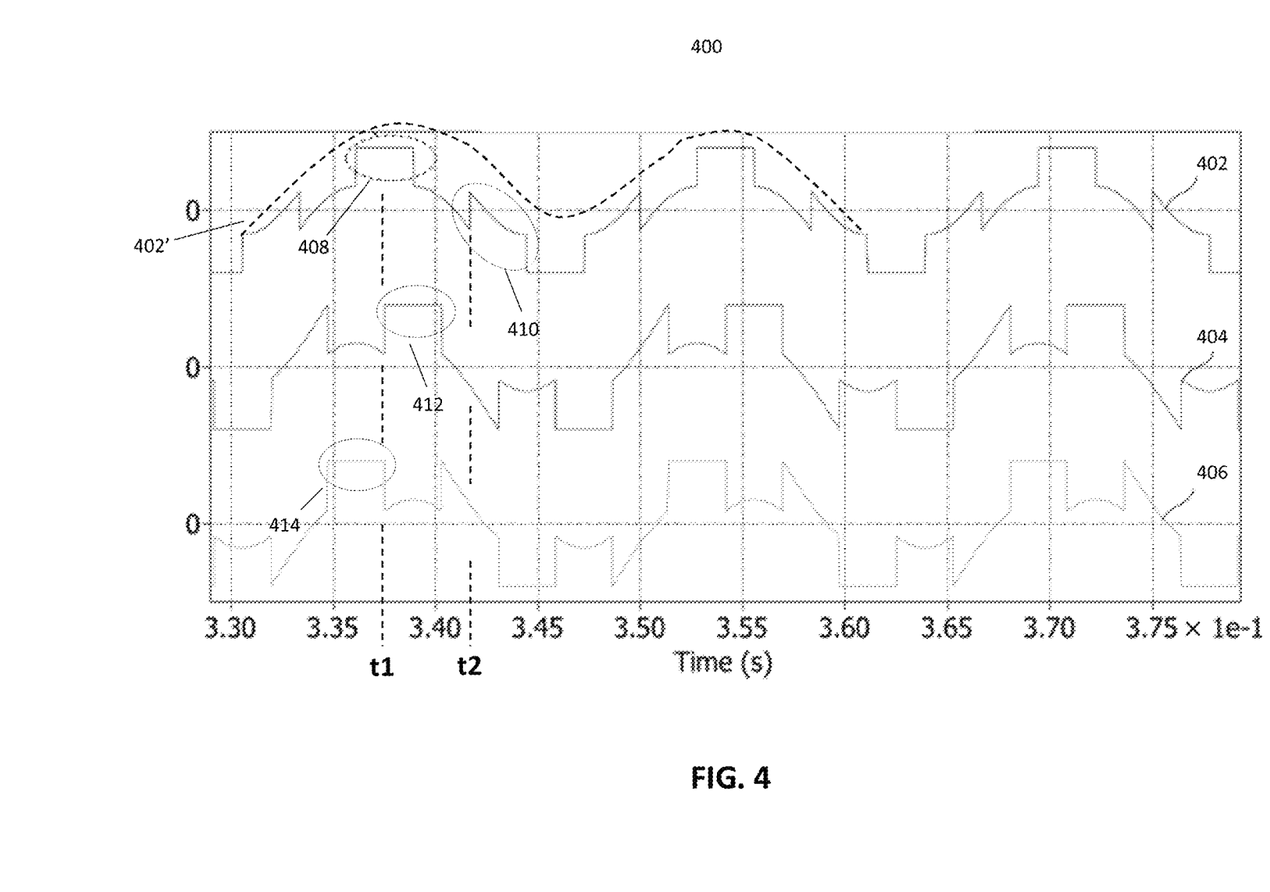
FIG. 4 is a graphical illustration of phase shifted 3-phase waveforms produced in accordance with the embodiments.

FIG. 4 is a graphical illustration 400 depicting phase shifted 3-phase waveforms 402, 404, and 406 produced by DPWM techniques in accordance with embodiments. In the graph 400, the term discontinuous refers to square-top segments of the waveforms, such as the square-top segment 408 of the waveform 402. Careful observation of the waveform 402, for example, reveals the outline of a sine wave pattern 402' within the shape of the waveform 402.

The waveforms 402, 404, and 406 are produced as outputs from the IGBTs of a multilevel conversion system, such as the IGBTs 302 A-C of the system 300 in FIG. 3. For example, the waveform 402 is produced by injecting a modulation signal (i.e., gating signal) onto the waveform 402. The modulation signal is triggered by a user programmable control signal output from the controller 310, to the modulator 308. In the exemplary embodiment of FIG. 4, the modulator 308 produces a DPWM common mode reference signal as an output for superimposing onto the 3-phase waveform 402. Superimposing the common mode signal atop the 3-phase sine wave 402 creates an over modulation effect creating the square-top segment 408. This over modulation halts the switching of the IGBTs.

When using conventional PWM techniques, switching of the IGBTs occurs throughout the entire waveform cycle. However, DPWM techniques in accordance with the exemplary embodiments force the IGBT to stop switching for a predetermined period of time (e.g., 120°), or time quantum. During this time quantum, in the middle of a sinewave waveform cycle, the IGBT switching can be controlled in response to the pattern of the waveform 402, as illustrated in FIG. 4.

As depicted in the graph 400, when viewed on a three-phase basis, PWM is shown to occur throughout the cycle because while the IGBT is switched off during one portion of the cycle, it continues to switch during the remaining two portions of the cycle. This process is rotated throughout each of the three portions associated with the waveform—the IGBTs being turned off for at least one portion while switching during the other two portions of the cycle. More specifically, the IGBTs are switched when during a very high peak or a very low peak, which represents when a particular phase is being turned off.

The inventors of the DPWM techniques described in the present application leverage the fact that when the IGBT is switching, it causes conduction and switching losses. However, if the IGBT can be turned off for a time quantum, the switching loss does not occur during that time quantum. Only the conduction loss occurs. The reduced losses enable the IGBT to run at cooler temperatures. With the IGBT running cooler, the current can run at maximum values to produce a higher kilovolt-ampere (kVA) output.

Thus, the DPWM technique of the embodiments results in a lower power loss in the IGBT, which optimizes the output capability of the overall system. Conventional systems, which mainly use standard PWM techniques, cannot achieve similar levels of optimization.

By way of example, the waveform 402 optimizes power at unity PF, and works best at real power. When the power is maximized, the controller 310 is configured to activate a DPWM mode, enabling the IGBT to stop switching. Thus, the switching loss is eliminated at a time when the output current is highest, thereby optimizing the system at unity power factor. This concept is illustrated in the waveform 402. As the PF of the load changes, the current moves to different areas of the waveform 402.

For example, as the PF begins to become all reactive, the current also moves so that the peak current of the waveform 402, represented by the square-top segment 408, would be right down the middle (e.g., at times t1). Correspondingly, this is also the point where the IGBT switching is occurring.

Stated another way, the square-top segment 408 moves in a manner that follows the peak of the current. Therefore, the IGBT is always shut off at the point when the current IGBT is highest. In other words, the PWM pattern is being adapted to align the shutting off of the IGBT with the peak current in IGBT. This approach, which can be referred to as current tracking, enables the IGBT temperatures to be kept as low as possible in response to the power factor changes.

Referring to the waveform 402 of FIG. 4, when the PF is at unity in real power, the sine wave current is precisely aligned with the sine wave voltage. That is, the square-top 408 current is aligned with the peak voltage of the sine wave. As the PF in the waveform 402 changes to mostly reactive, the peak of the sine wave becomes side segment 410. This step represents moving the peak of the IGBT current to a point where the IGBT is switching.

The gating signal output from the modulator 308 creates a DPWM pattern in the waveform 402. The current in the waveform 402 may, or may not, be aligned with the voltage. Thus, the injection of the DPWM gating signal creates a voltage sine wave, and the current can be positioned anywhere in the waveform 402. The position of the square-top segment 408 (i.e., time t1) represents an alignment that would make real power and unity PF. A move to the right 90° (i.e., time t2) would represent all reactive power. This process illustrates aligning switching of the IGBTs with the current, instead of with the voltage, thus creating more reactive power.

By way of example, waveform 404 represents shifting the current to the right a few degrees, depicted as square-top segment 412. Similarly, waveform 406 represents shifting the current to the left a few degrees, depicted as square-top segment 414. In this manner, output of the DPWM signals from the modulator 308 is synchronized to produce square-top segments that are aligned with peaks of the output current factor to control IGBT switching.

More specifically, the aforementioned DPWM techniques provide an ability to move the square-top segments (e.g., 408, 412, and 414, etc.) to follow the peak of the current. When the current is high, the IGBT is shut off (i.e., stops switching). Therefore, the disclosed DPWM method keeps the temperature as low as possible, as the power changes, and allows the IGBT switching inverter system run cooler, and more efficiently, because it has less power loss.

Figure 5:
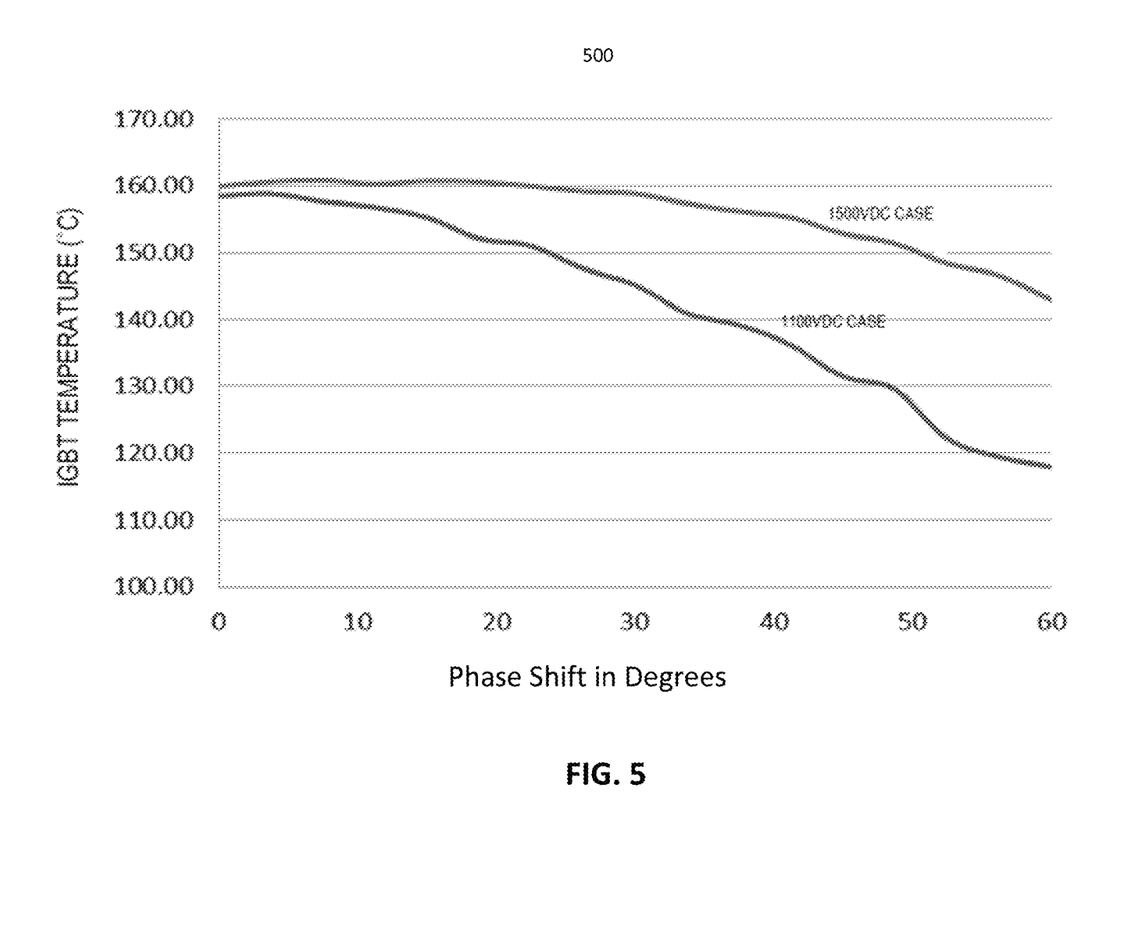
FIG. 5 is a graphical illustration comparing maximum IGBT temperatures for different DPWM cases at leading PF in accordance with the embodiments.

FIG. 5 is a graphical illustration 500 of simulation comparing maximum IGBT temperature for different DPWM cases at 0.1 leading power factor. In the embodiments, for example, a DPWM phase shift of 30° is the nominal case.

Figure 6:
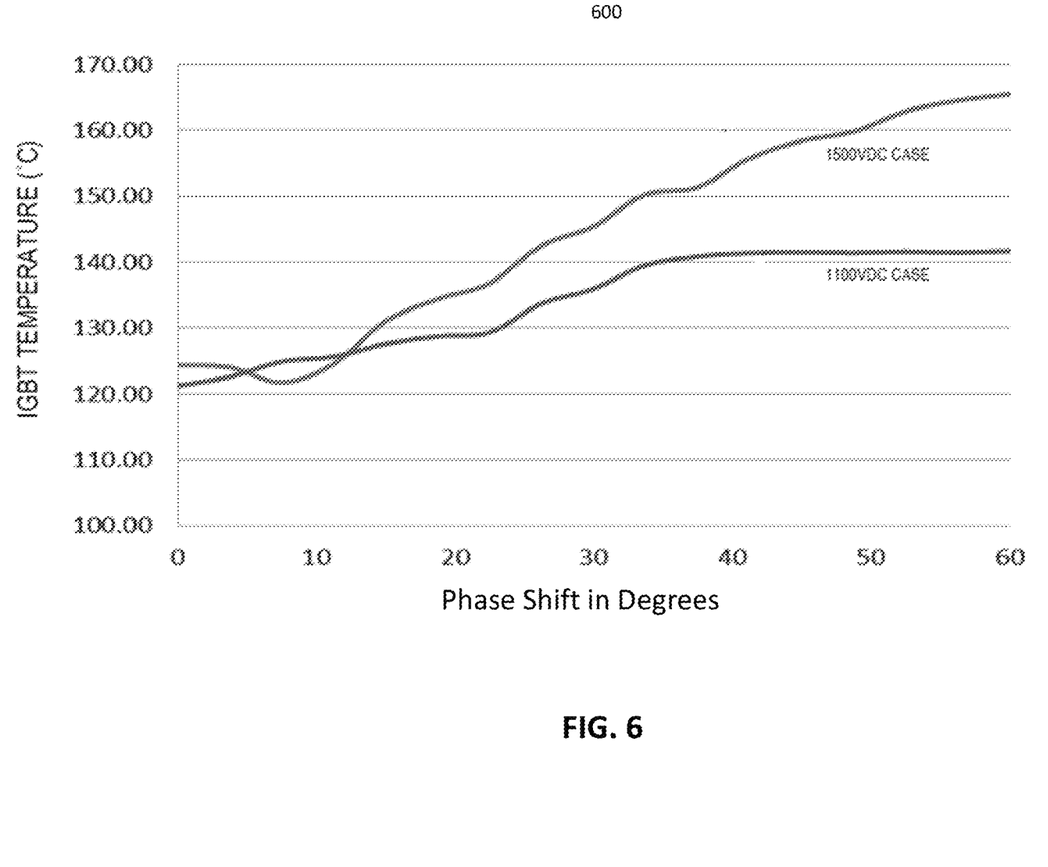
FIG. 6 is a graphical illustration of a simulation comparing maximum IGBT temperatures for different DPWM at lagging PF in accordance with the embodiments.

FIG. 6 is a graphical illustration 600 of simulation comparing maximum IGBT temperature for different DPWM phases at 0.1 lagging power factor. In the embodiments, as in the case of FIG. 6 above, a DPWM phase shift of 30° is the nominal case.

The exemplary illustration 500, for example, depicts the highly reactive nature of the 0.1 leading power factor having relatively low real power. 0 phase shift is the type of phase shift that would be associated with most PWM schemes.

In the embodiments, however, as illustrated in FIG. 5, by changing the phase shift before turning off the IGBT, the IGBT temperature can be significantly decreased. Since the IGBT can now run significantly cooler, correspondingly, it can operate at higher current and not exceed inherent limitations of the device. FIG. 6 depicts similar advantages at a 0.1 lagging power factor.

In the embodiments, for example, three parameters have independent timing: (a) timing of the AC current waveform, for example the time the current crosses zero amps, (b) timing of the AC voltage waveform, for example the time the voltage crosses zero volts, and (c) timing of the discontinuous period of switching (i.e., halted for a time quantum).

The DPWM approach of the embodiments facilitates predetermined periods of time, or time quanta, in which the IGBTs perform under a control scheme that adjusts the phasing. In FIG. 5, for example, nearly a 2× improvement in temperature (160° C. vs. 120° C.) can be realized by adjusting the phase by 60°. This improvement correspondingly produces highly optimized current performance and permits achievement of the full rating and capability of low reactive power. In some scenarios, for example, these techniques can provide for full rating in reactive power as opposed to 80%, for example.

Figure 7:
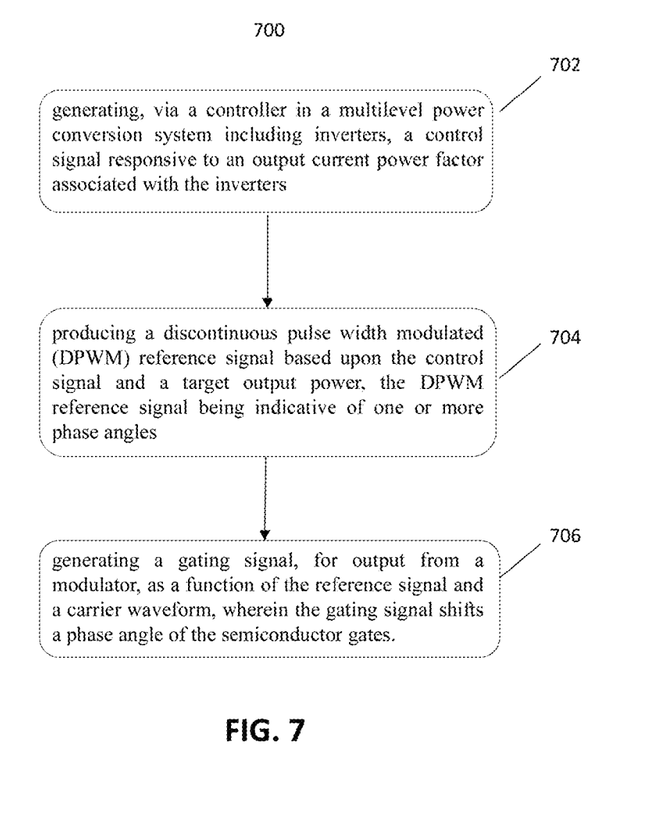
FIG. 7 is a flow chart of an exemplary method of practicing an embodiment of the present invention.

FIG. 7 is a flow chart of an exemplary method 700 of practicing an embodiment of the present invention. In the method 700, a control signal is generated, via a controller in a multilevel power conversion system including inverters, in block 702. The control signal is responsive to an output current power factor associated with the inverters. In block 704, a DPWM reference signal is produced based upon the control signal and a target output power. The DPWM reference signal is indicative of one or more phase angles. In block 706, a gating signal is generated for output from a modulator as a function of the reference signal and a carrier waveform. The gating signal shifts a phase angle of the semiconductor gates.

CONCLUSION

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. For example, multiple probes may be utilized at the same time to practice the present disclosure. Accordingly, the scope of the present disclosure is defined by the appended claims rather than the foregoing description and the exemplary embodiments described therein.

What is claimed is:

1. A method for controlling operation of gates of a plurality of semiconductors in a power conversion system including one or more multilevel inverters coupleable to a modulator and a controller, the method comprising:
   generating, via the controller, a control signal responsive to an output current power factor associated with the one or more multilevel inverters;
   producing a discontinuous pulse width modulation reference signal based upon the control signal and a target output power, the discontinuous pulse width modulation reference signal being indicative of shifting a phase angle between current and voltage; and
   generating a gating signal, for output from the modulator, as a function of the reference signal and a carrier waveform;
   wherein the gating signal adjusts the phase angle to prevent switching of the gates of the plurality of semiconductors.

2. The method of claim 1, wherein the adjusted phase angle is associated with timing of the discontinuous portion of the pulse width modulation.

3. The method of claim 1, further comprising, aligning the output current power factor with an output voltage associated with the plurality of semiconductors.

4. The method of claim 1, wherein the plurality of semiconductors are insulated gate bipolar transistors (IGBTs).

5. The method of claim 4, wherein the one or more multilevel inverters are configured in a neutral point clamped (NPC) arrangement.

6. The method of claim 1, wherein the power conversion system is constructed for three-phase operation.

7. The method of claim 1, wherein the control signal is user programmable via the controller.

8. A computer readable media storing instructions wherein said instructions when executed are adapted to control operation of gates of a plurality of semiconductors in a power conversion system including one or more multilevel inverters coupleable to a modulator and a controller, with a method comprising:

generating, via the controller, a control signal responsive to an output current power factor associated with the one or more multilevel inverters;

producing a discontinuous pulse width modulation reference signal based upon the control signal and a target output power, the discontinuous pulse width modulation reference signal being indicative of shifting a phase angle between current and voltage; and generating a gating signal, for output from the modulator, as a function of the reference signal and a carrier waveform;

wherein the gating signal adjusts the phase angle to prevent switching of the gates of the plurality of semiconductors.

9. The computer readable media of claim 8, wherein the adjusted phase angle is associated with timing of the discontinuous portion of the pulse width modulation.

10. The computer readable media of claim 8, further comprising, aligning the output current factor with an output voltage associated with the plurality of semiconductors.

11. The computer readable media of claim 8, wherein the plurality of semiconductors are insulated gate bipolar transistors (IGBTs).

12. The computer readable media of claim 11, wherein the one or more multilevel inverters are configured in a neutral point clamped (NPC) arrangement.

13. The computer readable media of claim 8, wherein the power conversion system is constructed for three-phase operation.

14. The computer readable media of claim 8, wherein the control signal is user programmable via the controller.

15. A system for controlling operation of gates of a plurality of semiconductor in a power conversion system including one or more multilevel inverters coupleable to a modulator and a controller, the system comprising:

a controller configured for producing a control signal responsive to an output current power factor associated with the one or more multilevel inverters; and a modulator coupled to the controller and configured for producing a discontinuous pulse width modulation reference signal based upon the control signal and a target output power, the discontinuous pulse width modulation reference signal being indicative of shifting a phase angle between current and voltage;

wherein the modulator is configured to generate a gating signal, for output from the modulator, as a function of the reference signal and a carrier waveform; and wherein the gating signal adjusts the phase angle to prevent switching of the gates of the plurality of semiconductors.

16. The system of claim 15, wherein the plurality of semiconductors are insulated gate bipolar transistors (IGBTs).

17. The system of claim 15, wherein the one or more multilevel inverters are configured in a neutral point clamped (NPC) arrangement.

18. The system of claim 15, wherein the power conversion system is constructed for three-phase operation.

19. The system of claim 15, wherein the control signal is user programmable via a controller.

20. The system of claim 15, wherein the gating signal controls switching of the plurality of semiconductors.

21. The system of claim 20, wherein the plurality of semiconductors are controlled when the output current power factor is at a maximum value.

22. The method of claim 1, wherein the plurality of semiconductors are controlled when the output current power factor is at a maximum value.

* * * * *